United States Patent
Lee (10) Patent No.: US 10,467,823 B2
(45) Date of Patent: Nov. 5, 2019

(54) APPARATUS AND METHOD FOR TRANSMITTING AND RECEIVING DATA

(71) Applicant: Samsung Electronics Co., Ltd., Suwon-si (KR)

(72) Inventor: Sun Jae Lee, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 101 days.

(21) Appl. No.: 15/348,185

(22) Filed: Nov. 10, 2016

(65) Prior Publication Data

US 2017/0148232 A1    May 25, 2017

(30) Foreign Application Priority Data

Nov. 20, 2015  (KR) .................. 10-2015-0163601

(51) Int. Cl.
| | |
|---|---|
| *G07C 5/00* | (2006.01) |
| *H04L 12/40* | (2006.01) |
| *B60L 3/00* | (2019.01) |
| *B60L 3/12* | (2006.01) |
| *B60L 50/00* | (2019.01) |

(52) U.S. Cl.
CPC ............ *G07C 5/008* (2013.01); *B60L 3/0046* (2013.01); *B60L 3/12* (2013.01); *B60L 50/00* (2019.02); *H04L 12/40* (2013.01); *B60L 2240/545* (2013.01); *B60L 2240/547* (2013.01); *B60L 2240/549* (2013.01); *H04L 2012/40215* (2013.01)

(58) Field of Classification Search
CPC .................... G07C 5/008; H04L 12/40; H04L 2012/40215
USPC ......................................................... 701/31.5
See application file for complete search history.

(56) References Cited

U.S. PATENT DOCUMENTS

| | | | | |
|---|---|---|---|---|
| 4,665,370 A | * | 5/1987 | Holland | G01R 31/3682 324/429 |
| 7,451,235 B2 | * | 11/2008 | Bunn | H03M 7/30 348/E7.073 |
| 8,054,039 B2 | * | 11/2011 | Bauerle | B60L 3/003 320/109 |
| 9,393,880 B2 | * | 7/2016 | Becker | H02J 13/0086 |
| 2002/0024691 A1 | * | 2/2002 | Kajita | H04B 10/079 398/9 |
| 2002/0073227 A1 | * | 6/2002 | Bunn | H03M 7/30 709/236 |

(Continued)

FOREIGN PATENT DOCUMENTS

| | | |
|---|---|---|
| EP | 0 300 775 B1 | 5/1995 |
| JP | 2002-76506 A | 3/2002 |

(Continued)

OTHER PUBLICATIONS

English translation of CN102205800, accessed via Espacenet May 9, 2018 (Year: 2018).*

*Primary Examiner* — Krishnan Ramesh
(74) *Attorney, Agent, or Firm* — NSIP Law (57) ABSTRACT

Apparatuses and methods for transmitting and receiving data are disclosed, where an apparatus for transmitting data includes a calculator configured to calculate a difference value between a reference value and a measurement data of a battery, and a transmitter configured to transmit an initial value and the difference value.

16 Claims, 6 Drawing Sheets

(56) References Cited

U.S. PATENT DOCUMENTS

| | | | |
|---|---|---|---|
| 2010/0156355 A1* | 6/2010 | Bauerle | B60L 3/003 320/145 |
| 2011/0231834 A1* | 9/2011 | Kim | G06F 1/3212 717/173 |
| 2012/0175953 A1* | 7/2012 | Ohkawa | B60L 3/0046 307/18 |
| 2013/0054071 A1* | 2/2013 | Yamane | H01M 10/425 701/22 |
| 2015/0191096 A1* | 7/2015 | Becker | H02J 13/0086 701/22 |
| 2016/0171794 A1* | 6/2016 | Brochhaus | B60L 3/0046 701/31.7 |

FOREIGN PATENT DOCUMENTS

| | | |
|---|---|---|
| JP | 2008-5111 A | 1/2008 |
| JP | 2012-49087 A | 3/2012 |
| JP | 2014-202630 A | 10/2014 |
| KR | 10-2015-0080214 A | 7/2015 |

\* cited by examiner

APPARATUS AND METHOD FOR TRANSMITTING AND RECEIVING DATA

CROSS-REFERENCE TO RELATED APPLICATION(S)

This application claims the benefit under 35 U.S.C. § 119(a) of Korean Patent Application No. 10-2015-0163601, filed on Nov. 20, 2015, in the Korean Intellectual Property Office, the entire disclosure of which is incorporated herein by reference for all purposes.

BACKGROUND

1. Field

The following description relates to an apparatus and method for transmitting data, and an apparatus and method for receiving data.

2. Description of the Related Art

While environment and energy issues increasingly become critical, electric vehicles have been hailed as the future of transportation. Due to the use of a battery as a primary power source, electric vehicles do not generate any exhaust gas and make a very small noise. The battery for the electric vehicle may be a high-power and large-capacity battery with several rechargeable/dischargeable secondary cells formed in one pack.

Batteries in electric vehicles carry out the same roles as engines and fuel tanks in gasoline vehicles. Thus, it is important to monitor the condition of batteries for the safety of users of electric vehicle, and it is important to efficiently manage data that is measured when the battery condition is monitored.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for transmitting data, the apparatus including a processor configured to calculate a difference value between a reference value and a measurement data of a battery, and transmit an initial value and the difference value.

The processor may include a calculator configured to calculate the difference value between the reference value and the measurement data of the battery, and a transmitter configured to transmit the initial value and the difference value.

The measurement data may be continuous data that changes over time.

The measurement data may be any one or any combination of voltage data, current data, and temperature data.

The reference value may be the initial value or a previous measurement data.

The apparatus may include an updater configured to update the initial value based on a criterion.

The updater may be configured to update the initial value to a present value of the measurement data according to an update interval.

The updater may be configured to update the initial value to the present value of the measurement data, in response to the difference value exceeding a threshold range.

The threshold range may be expressible using one byte.

The transmitter may be configured to transmit the initial value and the difference value over a controller area network (CAN).

In another general aspect, there is provided a method of transmitting data, the method including calculating a difference value between a reference value and a measurement data of a battery, and transmitting an initial value and the difference value.

The measurement data may be continuous data that changes over time.

The measurement data may be any one or any combination of voltage data, current data, and temperature data.

The reference value may be the initial value or a previous measurement data.

The method may include updating the initial value based on a criterion.

The updating of the initial value may include updating the initial value to a present value of the measurement data according to an update interval.

The updating of the initial value may include updating the initial value to the present value of the measurement data, in response to the calculated difference value exceeding a threshold range.

The threshold range may be expressible using one byte.

The transmitting of the initial value and the difference value may be performed over a controller area network (CAN).

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
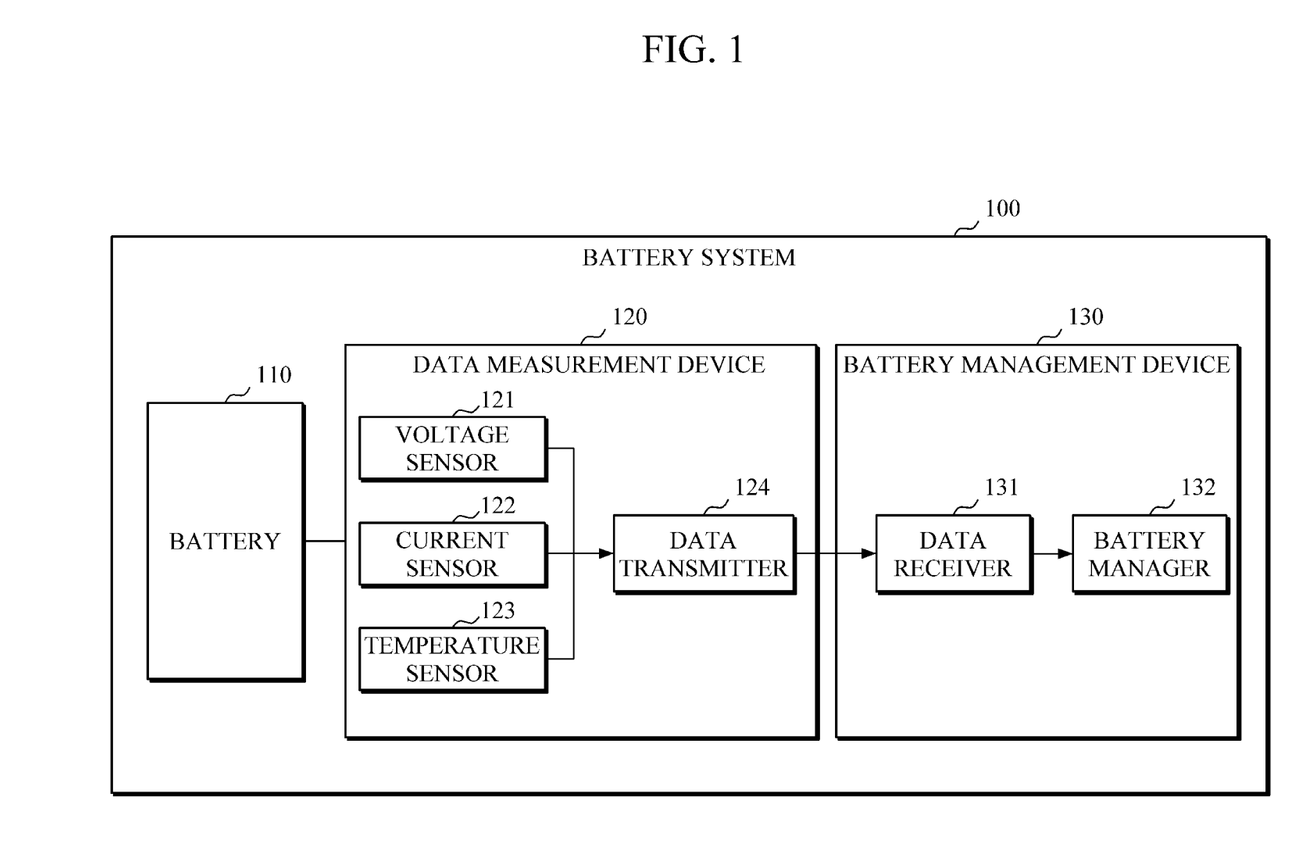
FIG. 1 is a diagram illustrating an embodiment of a battery apparatus.

FIG. 1 is a diagram illustrating an embodiment of a battery apparatus. Referring to FIG. 1, a battery apparatus 100 may include a battery 110, a data measurement device 120, and a battery management device 130.

The battery 110 may supply power to a device where the battery apparatus 100 is installed. The battery 110 may include a pack of batteries. In an example, the pack of batteries may include a plurality of battery modules, which are connected in series and/or parallel to each other, and each of which may include a plurality of battery cells. Each battery module or each battery cell may be a secondary battery, such as, for example, nickel-metal battery, or Li-ion battery. The capacity of each battery module may be the same as or different from each other.

In an example, the data measurement device 120 measures various types of data, and transmit the measurement data to the battery measurement device 130. In an example, the measurement data acquired by data measurement device 120 is continuous data, which is expressed as a value that changes continuously according to the passage of time. In an example, the measurement data acquired by data measurement device 120 changes gradually. The measurement data acquired by data measurement device 120 may be data such as, for example, voltage data, current data, and temperature data. In an example, the data measurement device 120 may include a voltage sensor 121, and a current sensor 122, a temperature sensor 123, and a data transmitter 124.

In an example, the voltage sensor 121 senses the voltage of a battery. In an example, the current sensor 122 senses the current of a battery. In an example, the temperature sensor 123 senses the temperature of a battery.

The data transmitter 124 may calculate the difference of the measured data between a present value and a reference value, and transmit an initial value and the calculated difference value to the battery management device 130 through a network interface. In an example, the reference value may be an initial value or the previous value.

In an example, the battery management device 130 monitors the condition of the battery 110, and according to the result of the monitoring, manages the battery. To this end, the battery management device 130 may include a data receiver 131 and a battery manager 132.

The data receiver 131 may receive the initial value and the difference value from the data measurement device 120 through the network interface, and based on the received initial value and difference value, recover the measurement data.

The battery manager 132 may manage the battery 110 based on the recovered data. In an example, the battery manager 132 controls the heat of the battery 110. In another example, the battery manager 132 prevents the battery 110 from being over-charged and over-discharged, and performs cell-balancing.

In an example, the battery manager 132 estimates the general condition of a battery based on a measurement of the battery's state, such as, for example, battery's state of charge (SOC) and state of health (SOH). In an example, the SOC indicates information on the amount of charges, which are stored in the battery 110. In an example, the SOH indicates information on how much the performance of the battery 110 has been degraded in comparison to the time of the manufacture.

According to an embodiment, the battery manager 132 may estimate the SOC of the battery 110 by using techniques such as, for example, a Coulomb counting method, an equivalent circuit modeling technique, an electrochemical modeling technique, and a data-based technique. However, the above-mentioned methods are only examples and not limited to any one in particular, and the battery manager 132 may estimate the SOC of the battery in various methods.

In an example, the battery manager 132 estimates the SOH of the battery 110 using open-circuit voltage (OCV) technique for estimating the SOH by estimating the open voltage of the battery 110. In another example, the battery manager 132 estimates the SOH of the battery 110 using electrochemical impedance spectroscopy (EIS) for estimating the SOH by estimating the internal resistance of the battery 110. However, the above-mentioned methods are only examples and not limited to any one in particular, and the battery manager 132 may estimate the SOH of the battery 110 in various methods.

According to an example, the battery apparatus 100 does not transmit and store the entire measurement data that has been acquired from the battery 110, but transmit and store a difference value between a present value and a reference value, and if needed, recover and use the data using the difference value. Thereby, the battery apparatus 100 increases a data transmission efficiency and saves data storage space.

Figure 2:
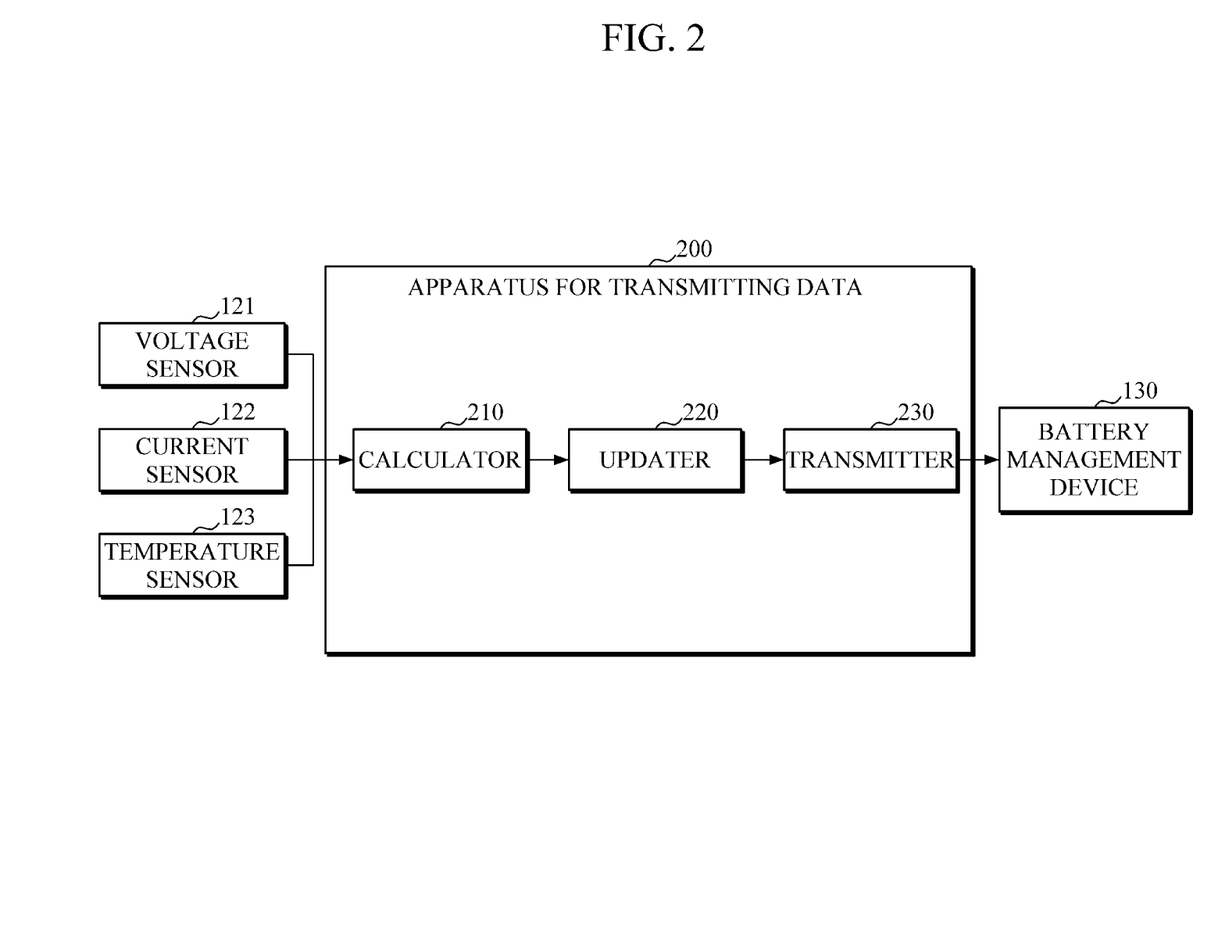
FIG. 2 is a diagram illustrating an embodiment of an apparatus for transmitting data.

FIG. 2 is a diagram illustrating an example of an apparatus for transmitting data 200. An apparatus 200 for transmitting data, as illustrated in FIG. 2, may be an example of a data transmitter 124 in FIG. 1. Referring to FIG. 2, the apparatus 200 includes a calculator 210, an updater 220, and a transmitter 230.

In an example, the calculator 210 compares the present value of the measurement data, acquired from a battery, to a reference value, and calculates a difference value between the present value and the reference value. In an example, the measurement data is continuous data, which is expressed as a value that changes continuously and gradually according to the passage of time. The measurement date may be data such as, for example, voltage, current, and temperature.

According to an example, the reference value may be an initial value of the measurement data. In such a case, the calculator 210 may compare a present value of the measurement data to the initial value of the measurement data, and calculate a difference value between the present value and the initial value.

TABLE 1

| Time (S) | Voltage Data (V) | Difference Value (V) |
|---|---|---|
| t0 | V0 = 3.456 | V0 = 3.456 |
| t1 | V1 = 3.402 | $\Delta 1 = V1 - V0 = -0.054$ |
| t2 | V2 = 3.345 | $\Delta 2 = V2 - V0 = -0.111$ |
| t3 | V3 = 3.545 | $\Delta 3 = V3 - V0 = +0.089$ |
| t4 | V4 = 4.021 | $\Delta 4 = V4 - V0 = +0.565$ |
| ... | ... | ... |

For example, as shown in Table 1, which shows a case of the measured voltage V0=3.456V at t0; the measured voltage V1=3.402 V at t1; the measured voltage V2=3.345 V at t2; V3=3.545 V at t3; and V4=4.021 V at t4, the calculator 210 may calculate difference values Δ1=−0.054, Δ2=−0.111, Δ3=+0.089, and Δ4=+0.565 between the initial value V0 and the values V1, V2, V3, and V4.

According to another example, the reference value may be the previous value of the present value. In this case, the calculator 210 compares the present value of the measurement data and the previous value, and calculates a difference value between the present value and the previous value.

TABLE 2

| Time (S) | Voltage Data (V) | Difference Value (V) |
|---|---|---|
| t0 | V0 = 3.456 | V0 = 3.456 |
| t1 | V1 = 3.402 | Δ1 = V1 − V0 = −0.054 |
| t2 | V2 = 3.345 | Δ2 = V2 − V1 = −0.057 |
| t3 | V3 = 3.545 | Δ3 = V3 − V2 = +0.200 |
| t4 | V4 = 4.021 | Δ4 = V4 − V3 = +0.476 |
| ... | ... | ... |

For example, as shown in Table 2, which shows at t0, the measured voltage V1=3.456 V; at t1, the measured voltage V1=3.402 V; at t2, the measured voltage V2=3.345 V; at t3, the measured voltage V3=3.545 V; and at t4, the measured voltage V4=4.021 V, the calculator 210 may calculate difference values Δ1=−0.054, Δ2=−0.057, Δ3=+0.200, and Δ4=+0.476 between values V0, V1, V2, V3, and V4 and their respective previous values.

In an example, if the initial value is updated by an updater 220, the updated initial value may be applied when the calculator 210 calculates the difference value between a reference value and a present value of the data that is acquired from the battery.

For example, in the example of Table 1 where a reference value is an initial value, if the initial value is updated at t4 to the present value 4.021V. After the time t5, the updater 220 may calculate a difference value between the present value and the updated initial value using the updated initial value as a reference value.

In an example, the updater 220 updates the initial value based on a set criterion. In one example, if the difference value between the present value and the reference value exceeds a threshold range, the updater 220 may update the initial value to the present value. In an example, the threshold range indicate the range that is expressible using one byte, but an example is not limited thereto, and the threshold range may be set variously according to the performance or use of an apparatus.

In another example, the updater 220 may update the initial value to the present value at every update interval. The update interval may be set variously according to the performance and use of an apparatus.

In another example, the updater 220 may update the initial value to the present value at every update interval, and at the same time while the updating is being performed, may update the initial value to the present value even when the difference value between the present value and the reference value exceeds the threshold range.

In an example, the transmitter 230 transmits an initial value, a difference value, and an updated initial value to a battery management device 130 over a controller area network (CAN) in a vehicular environment. In other examples, the transmitter 230 use any wireless communication or network communication consistent with that disclosed herein.

The transmitter 230 first transmits an initial value, and then, if the initial value is not updated, the transmitter 230 transmits a difference value, but if the initial value is updated, transmits the updated initial value.

Figure 3:
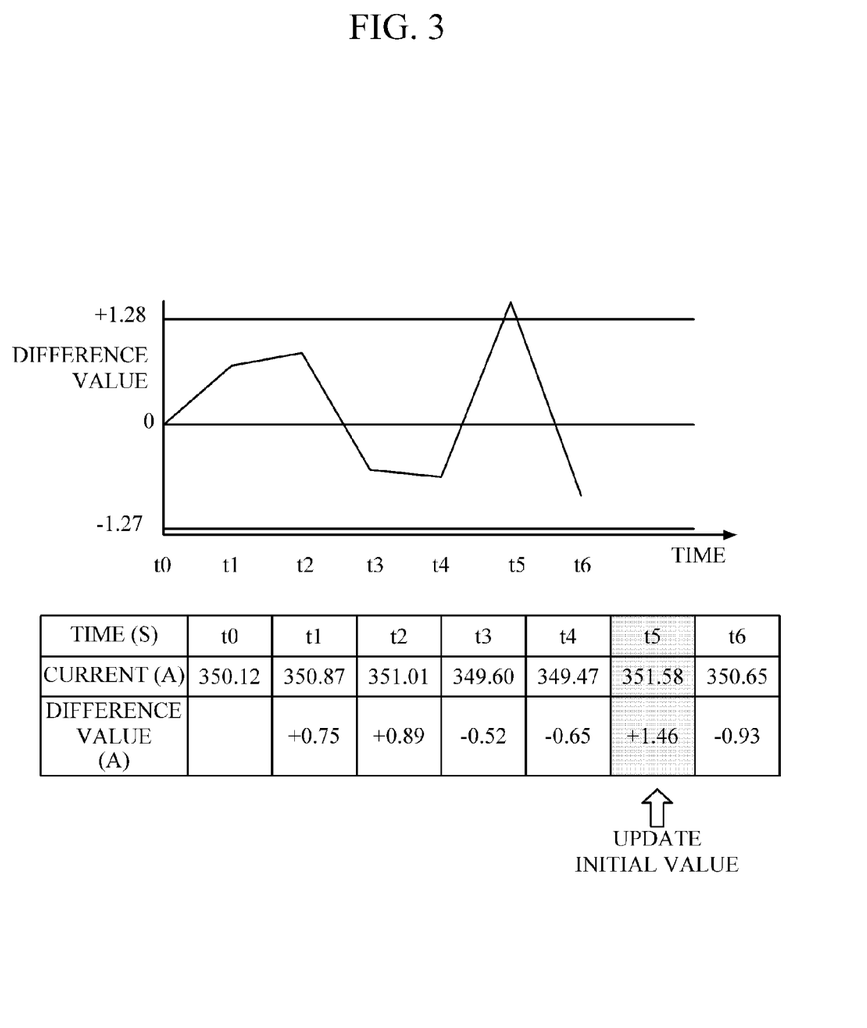
FIG. 3 is a diagram illustrating an embodiment of an operation of an apparatus for transmitting data.

FIG. 3 is a diagram illustrating an example of an operation of an apparatus for transmitting data. In the example in FIG. 3, it is assumed that a reference value is an initial value, and updating the initial value may be performed if a difference value between a present value and a reference value exceeds a threshold range. In addition, it is assumed that the threshold range is set as the range that is expressible using one byte (e.g., −1.27 A~+1.28 A).

Referring to FIGS. 2 and 3, an apparatus 200 for transmitting data transmits, to a battery management device 130, the battery's initial current 350.12 A that is measured at the time to.

The apparatus 200 compares the battery's current 350.87 A, measured at the time t1, and the initial value 350.12 A to calculate a difference value +0.75 A. The apparatus 200 transmits the calculated difference value +0.75 A to the battery management device 130.

The apparatus 200 compares the battery's current 351.01 A, measured at the time t2, and the initial value 350.12 A to calculate a difference value +0.89 A. The apparatus 200 transmits the calculated difference value +0.89 A to the battery management device 130.

The apparatus 200 compares the battery's current 349.60 A, measured at the time t3, and the initial value 350.12 A to calculate a difference value −0.52 A. The apparatus 200 transmits the calculated difference value −0.52 A to the battery management device 130.

The apparatus 200 compares the battery's current 349.47 A, measured at the time t4, and the initial value 350.12 A to calculate a difference value −0.65 A. The apparatus 200 transmits the calculated difference value −0.65 A to the battery management device 130.

The apparatus 200 compares the battery's current 351.58 A, measured at the time t5, and the initial value 350.12 A to calculate a difference value +1.46 A. The apparatus 200 transmits the calculated difference value +1.46 A to the battery management device 130. Since the calculated difference value +1.46 A exceeds the range of 1.27 A~+1.28 A that is expressible using one byte, the apparatus 200 updates the initial value to 351.58 A that is measured at the time t5. The apparatus 200 transmits the updated initial value 351.58 A to the battery management device 130.

The apparatus 200 compares the battery's current 350.65 A, measured at the time t6, and the updated initial value 351.58 A to calculate a difference value −0.93 A. The apparatus 200 transmits the difference value −0.93 A to the battery management device 130.

Figure 4:
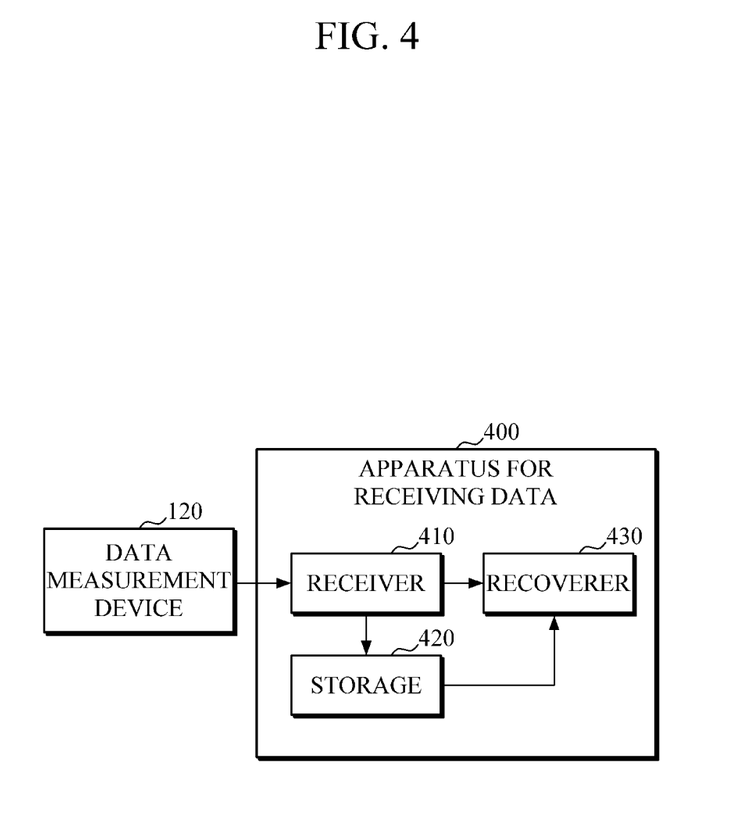
FIG. 4 is a diagram illustrating an embodiment of an apparatus for receiving data.

FIG. 4 is a diagram illustrating an example of an apparatus for receiving data. An apparatus 400 for receiving data in FIG. 4 may be an example of a data receiver 131 in FIG. 1. Referring to FIG. 4, the apparatus 400 for receiving data includes a receiver 410, a storage 420, and a recoverer 430.

The receiver 410 may receive an initial value, a difference value, and an updated initial value from a data measurement device 120 through a network interface.

The storage 420 may store the received initial value, difference value, and updated initial value. In another example, the storage 420 stores a program for processing and managing data in a battery.

The storage 510 may include at least one of the types of storage media, such as, for example, flash memory, hard disk, multimedia card micro, card (e.g., SD or XD memory), random access memory (RAM), static random access memory (SRAM), read only memory (ROM), electrically erasable programmable read only memory (EEPROM), programmable read only memory (PROM), magnetic memory, magnetic disk, optical data storage devices, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions.

In an example, the recoverer 430 recovers the measurement data, which has been acquired from the battery, based on the received initial value, difference value, and updated initial value.

If the reference value is an initial value, indicating that a difference value is acquired from the difference between a present value and the initial value, the recoverer 430 may recover the data by adding the initial value, or the updated initial value, to the difference value.

In another example, if the reference value is the previous value, indicating that the difference value is acquired from the difference between the present value and the previous value, the recoverer 430 may recover the data by accumulating the difference values from the initial value, or the updated initial value, up to the present value, and then adding the initial value, or the updated initial value to the accumulation value.

Figure 5:
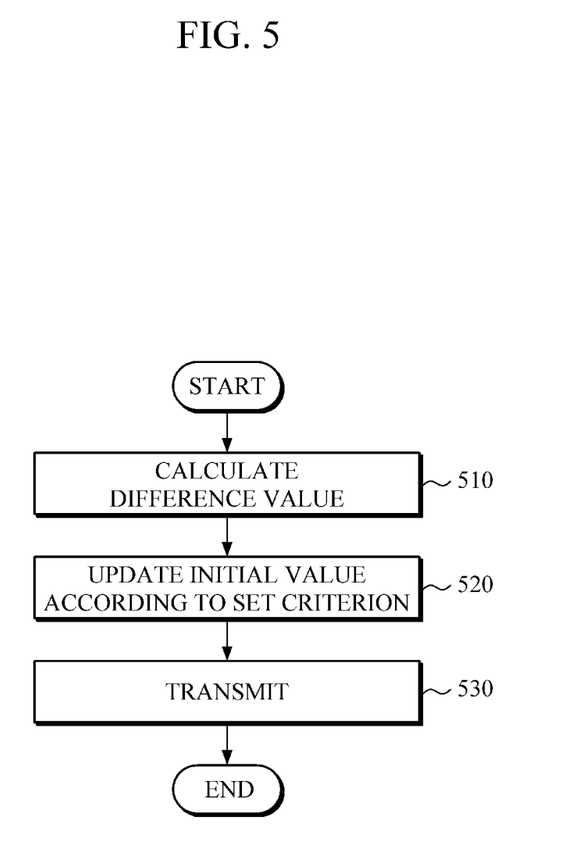
FIG. 5 is a diagram illustrating an embodiment of a method of transmitting data.

FIG. 5 is a diagram illustrating an example of a method of transmitting data. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. In addition to the description of FIG. 5 below, the above descriptions of FIGS. 1-4, are also applicable to FIG. 5, and are incorporated herein by reference. Thus, the above description may not be repeated here.

Referring to FIGS. 2 and 5, in 510, an apparatus 200 compares a present value of measurement data acquired from a battery to a reference value, and calculates a difference value between the present value and the reference value. In an example, the measurement data acquired from the battery is continuous data, which is expressed as a value that changes continuously and gradually according to the passage of time. In an example, the measurement data is data such as, for example, voltage data, current data, and temperature data. The reference value may be the initial value, or the previous value of the present value.

In 520, the apparatus 200 may update the initial value based on a set criterion. In one example, if the difference value between the present value and the reference value exceeds a threshold range, the apparatus 200 may update the initial value to the present value. In an example, the threshold range indicates the range that is expressible using one byte, but an example is not limited thereto, and the threshold range may be set variously according to the performance or use of an apparatus.

In another example, the apparatus 200 may update the initial value to the present value at every update interval. In an example, the update interval may be set variously according to the performance and use of an apparatus.

In another example, the apparatus 200 may update the initial value to the present value at every update interval, and while the updating is being performed, may update the initial value to the present value even when the difference value between the present value and the reference value exceeds the threshold range.

In an example, the apparatus 200 transmits an initial value, a difference value, and an updated initial value to a data processing device over a controller area network (CAN).

Figure 6:
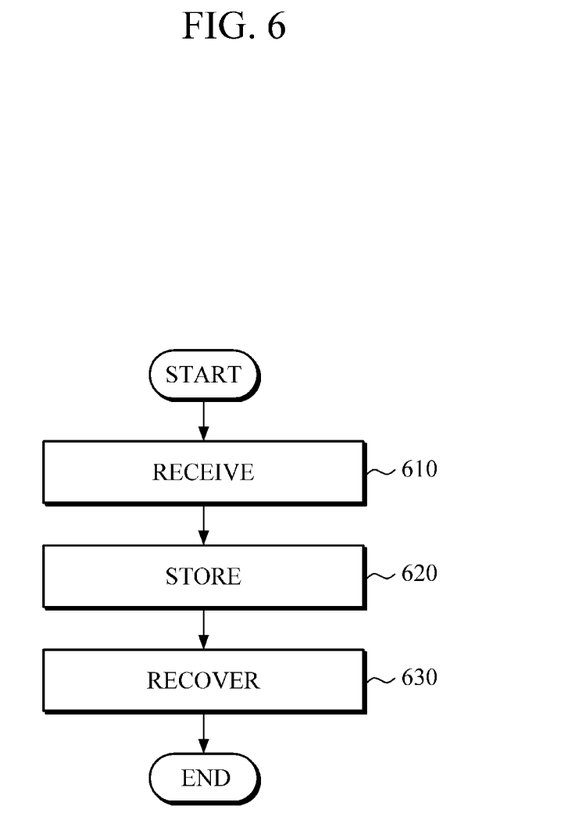
FIG. 6 is a diagram illustrating an embodiment of a method of receiving data.

FIG. 6 is a diagram illustrating an example of a method of receiving data. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. In addition to the description of FIG. 6 below, the above descriptions of FIGS. 1-5, are also applicable to FIG. 6, and are incorporated herein by reference. Thus, the above description may not be repeated here.

Referring to FIGS. 4 and 6, in a example, in 610, an apparatus 400 for receiving data receives an initial value, a difference value, and an updated initial value from a data measurement device 120 over a controller area network (CAN).

In 620, apparatus 400 stores the received initial value, difference value, and updated initial value.

In 630, the apparatus 400 may recover the measurement data, which has been acquired from a battery, based on the received initial value, difference value, and updated initial value.

If the reference value is an initial value, indicating that a difference value is acquired from the difference between a present value and the initial value, the apparatus 400 may recover the data by adding the initial value, or the updated initial value, to the difference value.

In another example, if the reference value is the previous value, indicating that the difference value is acquired from the difference between the present value and the previous value, the apparatus 400 may recover the data by accumulating the difference values from the initial value, or the updated initial value, up to the present value, and then to the accumulation value, adding the initial value, or the updated initial value.

In an example, the battery apparatus 100 may be embedded in or interoperate with various digital devices such as, for example, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein. The digital devices may be may be embedded in or interoperate with a smart appliance, an intelligent vehicle, an electric vehicle, a hybrid vehicle, a smart home environment, or a smart building environment.

The battery apparatus 100, data measurement device 120, battery management device 130, voltage sensor 121, current sensor 122, temperature sensor 123, data transmitter 124, data receiver 131, battery manager 132, apparatus 200 for transmitting data, calculator 210, updater 220, transmitter 230, apparatus 400 for receiving data, receiver 410, storage 420, and recoverer 430 described in FIGS. 1-2 and 4 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for transmitting data, the apparatus comprising:
a processor configured to
measure, at a first time interval, measurement data of a battery;
calculate a difference between an initial reference value and the measurement data of the battery;
update the initial reference value to a value of the measurement data at the first time interval in response to a criterion being met, to generate an updated reference value; and
transmit either the difference or the updated reference value to a battery management device.

2. The apparatus of claim 1, wherein the measurement data is continuous data that changes over time and comprises any one or any combination of any two or more of voltage data, current data, or temperature data.

3. The apparatus of claim 1, wherein the initial reference value comprises a previous value of previous measurement data measured at a time interval occurring before the first time interval.

4. The apparatus of claim 1, wherein the criterion is an update interval.

5. The apparatus of claim 1, wherein:
the criterion is the difference exceeding a threshold range; and
the processor is further configured to transmit, in response to the difference exceeding the threshold range, the updated reference value to the battery management device.

6. The apparatus of claim 5, wherein the threshold range is expressible using one byte.

7. The apparatus of claim 1, wherein the processor is further configured to transmit the updated reference value or the difference over a controller area network (CAN).

8. The apparatus of claim 1, wherein the processor is further configured to:
in response to the initial reference value being updated, transmit the updated reference value to the battery management device; and
in response to the initial reference value not being updated, transmit the difference to the battery management device.

9. A method of transmitting data, the method comprising:
measuring, at a first time interval, measurement data of a battery;
calculating a difference between an initial reference value and the measurement data of the battery;
updating the initial reference value to a value of the measurement data at the first time interval in response to a criterion being met, to generate an updated reference value; and
transmitting either the difference or the updated reference value to a battery management device.

10. The method of claim 9, wherein the measurement data is continuous data that changes over time, and comprises any one or any combination of any two or more of voltage data, current data, or temperature data.

11. The method of claim 9, wherein the initial reference value comprises a previous value of previous measurement data measured at a time interval occurring before the first time interval.

12. The method of claim 9, wherein the criterion is an update interval.

13. The method of claim 9, further comprising:
the criterion being the difference exceeding a threshold range; and
transmitting, in response to the difference exceeding the threshold range, the updated reference value to the battery management device.

14. The method of claim 13, wherein the threshold range is expressible using one byte.

15. The method of claim 9, wherein the transmitting of the updated reference value or the difference is performed over a controller area network (CAN).

16. A non-transitory computer-readable storage medium storing instructions that, when executed by a processor, cause the processor to perform the method of claim 9.

* * * * *